(12) United States Patent
Nakamura (10) Patent No.: US 12,451,007 B2
(45) Date of Patent: Oct. 21, 2025

(54) INFORMATION PROCESSING DEVICE AND INFORMATION PROCESSING METHOD

(71) Applicant: Nissan Motor Co., Ltd., Yokohama (JP)

(72) Inventor: Mitsunori Nakamura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 304 days.

(21) Appl. No.: 18/547,884

(22) PCT Filed: Mar. 10, 2021

(86) PCT No.: PCT/IB2021/000178
§ 371 (c)(1),
(2) Date: Aug. 25, 2023

(87) PCT Pub. No.: WO2022/189824
PCT Pub. Date: Sep. 15, 2022

(65) Prior Publication Data
US 2024/0135808 A1   Apr. 25, 2024
US 2024/0233528 A9   Jul. 11, 2024

(51) Int. Cl.
G08G 1/09 (2006.01)
G08G 1/052 (2006.01)
H04B 7/0404 (2017.01)

(52) U.S. Cl.
CPC .............. G08G 1/09 (2013.01); G08G 1/052 (2013.01); H04B 7/0404 (2013.01)

(58) Field of Classification Search
CPC ........ H04B 7/0814; H04B 7/086; H04B 1/40; H04B 1/3822; H04B 17/318; H04B 7/06;
(Continued)

(56) References Cited

U.S. PATENT DOCUMENTS 7,010,023 B1 * 3/2006 Sato .................. H04B 7/086
                                                375/150
8,400,331 B2 * 3/2013 Nagatomo ....... G08G 1/096783
                                                340/995.13
(Continued)

FOREIGN PATENT DOCUMENTS

JP    2002-342887 A    11/2002
JP    2010-238053 A    10/2010
(Continued)

OTHER PUBLICATIONS

1 Extended European Search Report of Mar. 20, 2024 of corresponding European Patent Application No. 21929434.5.

*Primary Examiner* — Anthony S Addy
(74) *Attorney, Agent, or Firm* — GLOBAL IP COUNSELORS, LLP (57) ABSTRACT

An information processing device includes a communication unit and a controller. The communication unit performs data communication with another vehicle present in a periphery of a host vehicle. The controller controls the data communication performed by the communication unit. The controller specifies each second other vehicle for which a quality of communication with the host vehicle does not satisfy a prescribed standard as a designated moving body. The controller identifies a relative position relative to the host vehicle, and a reception power of radio waves received from the designated moving body, for each designated moving body. The controller controls directivity related to wireless communication performed by the communication unit based on the relative position and reception power for each other vehicle.

12 Claims, 6 Drawing Sheets

(58) Field of Classification Search
CPC ....... H01Q 1/1257; H01Q 3/24; H04W 16/28; H04W 84/20; H04W 4/46; H04W 4/40; H04W 4/029; G01S 2013/93271; G08G 1/09; G08G 1/16; G08G 1/052
See application file for complete search history.

(56) References Cited

U.S. PATENT DOCUMENTS

| | | | |
|---|---|---|---|
| 10,911,962 B2* | 2/2021 | Foerster | H04W 4/70 |
| 2002/0177963 A1* | 11/2002 | Hirabe | H01Q 3/2605 |
| | | | 702/66 |
| 2014/0292578 A1* | 10/2014 | Ibrahim | H01Q 1/1257 |
| | | | 342/368 |
| 2017/0244160 A1* | 8/2017 | Neubecker | H01Q 1/3208 |
| 2021/0012644 A1* | 1/2021 | Sasaki | H04W 4/90 |
| 2021/0235285 A1* | 7/2021 | Guerena | H04W 16/28 |

FOREIGN PATENT DOCUMENTS

| | | |
|---|---|---|
| JP | 2010-282562 A | 12/2010 |
| JP | 2014-14087 A | 1/2014 |
| JP | 2017-34496 A | 2/2017 |
| JP | 2018-67880 A | 4/2018 |

\* cited by examiner

INFORMATION PROCESSING DEVICE AND INFORMATION PROCESSING METHOD

CROSS-REFERENCE TO RELATED APPLICATIONS

This application is a U.S. national stage application of International Application No. PCT/IB2021/000178, filed on Mar. 10, 2021.

BACKGROUND

Technical Field

The present invention relates to an information processing device and an information processing method.

Background Information

Japanese Laid-Open Patent Application No. 2018-67880 (Patent Document 1) discloses a communication device comprising a communication unit that performs vehicle-to-vehicle communication with a plurality of other vehicles present around a host vehicle via an antenna unit. The communication device furthermore comprises an acquisition unit for acquiring information relating to the plurality of other vehicles, and a control unit for controlling a directivity of the antenna unit based on the information acquired by the acquisition unit.

SUMMARY

A technique disclosed in Patent Document 1 involves controlling a directivity of an antenna unit with respect to other vehicles detected by a radar device. Therefore, even in a case involving other vehicles that could affect future travel, the directivity of the antenna unit is not controlled with respect to the other vehicles until the radar device can actually detect the other vehicles. Therefore, there is a concern that it will be impossible to suitably accept necessary information.

The present invention was contrived in view of the foregoing problem, it being an object of the present invention to provide an information processing device and an information processing method with which it is possible to suitably accept necessary information.

An information processing device according to one aspect of the present invention comprises a communication unit for performing data communication with a plurality of second moving bodies present around a first moving body, and a controller for controlling the data communication performed by the communication unit. The controller specifies each second moving body for which a quality of communication with the first moving body does not satisfy a prescribed standard as a designated moving body and controls directivity related to wireless communication performed by the communication unit based on a relative position and a reception power for each designated moving body.

The present invention makes it possible to suitably accept necessary information.

BRIEF DESCRIPTION OF THE DRAWINGS

Referring now to the attached drawings which form a part of this original disclosure.

DETAILED DESCRIPTION OF EMBODIMENTS

A preferred embodiment of the present invention is described below with reference to the accompanying drawings. Identical configurations appearing in the drawings are assigned identical reference symbols and are not redundantly described.

Figure 1:
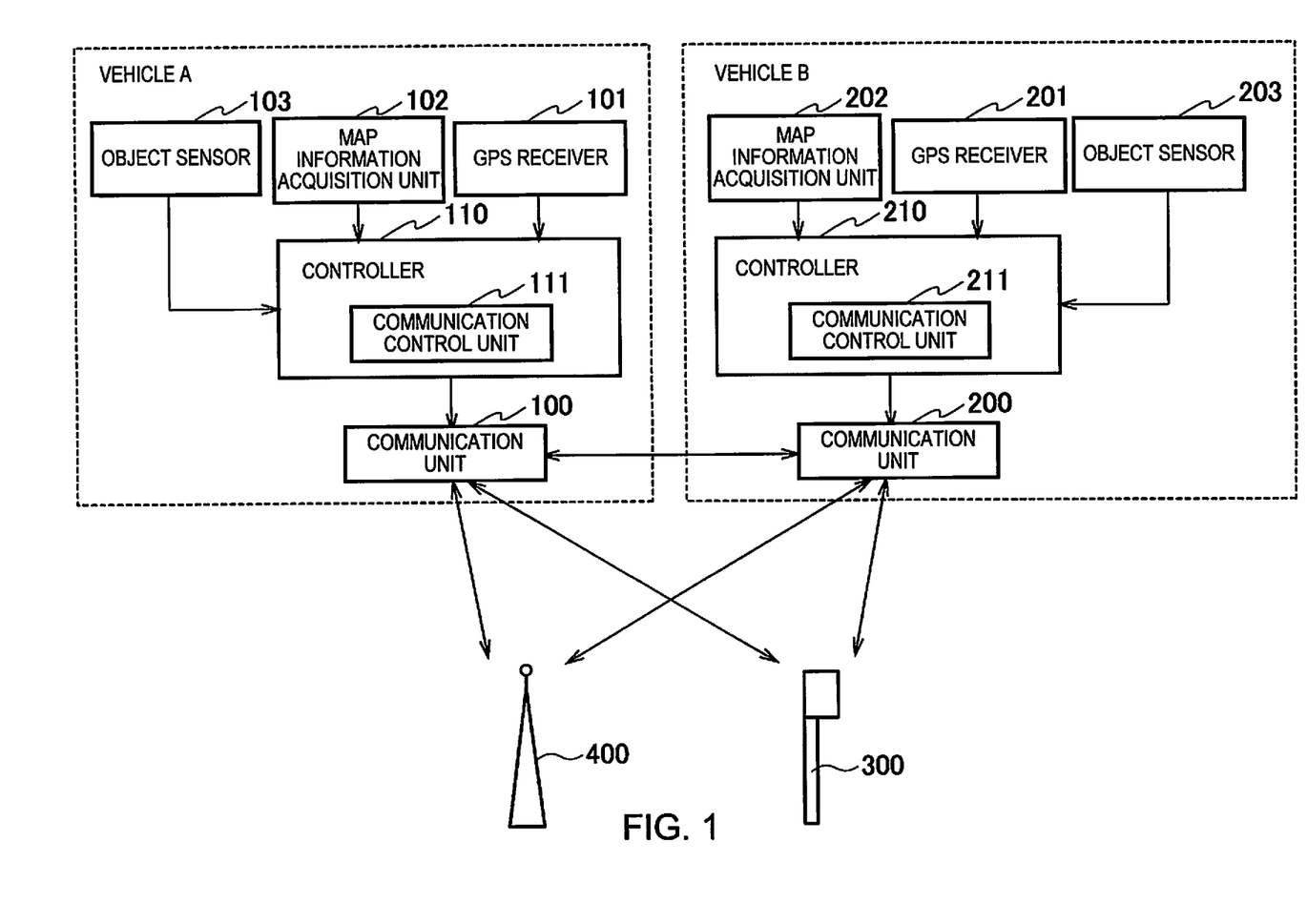
FIG. 1 is a block diagram showing a communication network according to the present embodiment.

A communication network according to the present embodiment shall now be described with reference to FIG. 1. The communication network according to the present embodiment is provided with a vehicle A and a vehicle B. The vehicle A and the vehicle B are examples of moving bodies (first moving body and second moving body). The vehicle A is a host vehicle, and the vehicle B is another vehicle present around the host vehicle. In FIG. 1, only a single vehicle B is depicted, but there can be a plurality of vehicles B.

The vehicle A and the vehicle B can have autonomous driving functions, but also can lack autonomous driving functions. Additionally, the vehicle A and the vehicle B can be capable of switching between autonomous driving and manual driving. In the present embodiment, the vehicle A and the vehicle B are described as vehicles having autonomous driving functions.

The communication network is furthermore provided with a roadside unit 300 and a base station 400.

The vehicle A is provided with a communication unit 100 having a data communication function. The vehicle B is provided with a communication unit 200 having a data communication function. Each of the communication units 100, 200 is configured from, e.g., one or more antennas, a modem, an application processor, a memory, and the like.

The communication unit 100 and the communication unit 200 are capable of communicating directly with one another. Direct communication performed by the communication unit 100 and the communication unit 200 is defined below as direct communication. Direct communication can also be expressed as vehicle-to-vehicle communication. In the present embodiment, the vehicle A and the vehicle B are capable of sharing a plurality of items of data, such as information pertaining to the vehicles (vehicle A and vehicle B), through direct communication.

The communication unit 100 and the communication unit 200 are capable of communicating with one another via a base station 400 and a network (not shown; e.g., cellular telephone network or the like). The base station 400 is a fixed communication device that does not move, the base station 400 serving as an access point that covers the network. Communication performed between the communication unit 100 and the communication unit 200 via the base station 400 and the network is defined as indirect communication, in contrast to direct communication.

Direct communication, due to not being performed via the base station 400 and the network, makes it possible to transmit data to a counterpart using a simple configuration having low delay. Indirect communication is used when transmitting high-volume data that cannot be sent by direction communication or data that is to be repeatedly sent without there being any change in given-time information. Indirect communication can also be used in cases in which direct communication is impossible.

Each of the communication units 100, 200 can communicate with the roadside unit 300. The roadside unit 300 is a fixed communication device that can be installed, for example, on a road facility at a road shoulder, the roadside unit 300 distributing distribution data including prescribed information to vehicles on a road. The roadside unit 300 (RSU) can also be referred to as an intelligent transport systems (ITS) spot.

The roadside unit 300 indicated in the present embodiment corresponds to a transmitting station, and the communication units 100, 200 correspond to receiving stations. The roadside unit 300 and the communication units 100, 200 perform downlink communication from the roadside unit 300 to the communication units 100, 200. However, the roadside unit 300 and the communication units 100, 200 are capable of performing uplink communication in a reverse direction. In such a case, the communication units 100, 200 correspond to transmitting stations, and the roadside station 300 corresponds to a receiving station. Communication between the communication units 100, 200 and the roadside unit 300 is also referred to as road-to-vehicle communication.

The distribution data that is distributed from the roadside unit 300 includes roadside-unit data indicating information pertaining to the roadside unit 300, and traffic data indicating information pertaining to vehicles present around the roadside unit 300. The information pertaining to the roadside unit 300 includes, inter alia, position information pertaining to the roadside unit 300. The information pertaining to vehicles includes, inter alia, position information, speed information, and advancement-direction information pertaining to the vehicles.

A configuration of the vehicle A shall be described next.

The vehicle A is provided with the communication unit 100 described above, a GPS receiver 101, a map information acquisition unit 102, an object sensor 103, and a controller 110. The communication unit 100, GPS receiver 101, map information acquisition unit 102, and controller 110 constitute an information processing device for realizing the vehicle-to-vehicle communication indicated in the present embodiment.

The GPS receiver 101 receives radio waves from an artificial satellite, thereby detecting position information pertaining to the vehicle A on a surface of Earth. The position information pertaining to the vehicle A detected by the GPS receiver 101 includes latitude information, longitude information, and time information. The GPS receiver 101 outputs the detected position information pertaining to the vehicle A to the controller 110. A method by which the position information pertaining to the vehicle A is detected is not limited to involving the GPS receiver 101. For example, the position can be estimated using a method known as odometry. Odometry is a method for deriving an amount of movement of the vehicle A and a movement direction thereof in accordance with a turning angle and a turning-angle speed of the vehicle A, whereby the position of the vehicle A is estimated. A global positioning system (GPS) is part of a global navigation satellite system (GNSS).

The map information acquisition unit 102 acquires map information indicating a structure of the road on which the vehicle A is traveling. The map information acquisition unit 102 can possess a map database in which the map information is stored or can acquire the map information from an external map data server through cloud computing. The map information acquisition unit 102 can also acquire the map information using vehicle-to-vehicle communication or road-to-vehicle communication.

The map information includes: node information, including a type of node, a position of the node, or other information indicating an intersection, junction, or the like; and link information, including a type, link length, lane count, curvature, slope, or other features of a link that is a road segment linking nodes. The link information also includes information pertaining to road structure, such as absolute positions of lanes and relationships pertaining to connection of the lanes. The map information furthermore includes information pertaining to traffic regulations, road signs, and the like.

The object sensor 103 is mounted in the vehicle A and detects objects around the vehicle A. The object sensor 103 includes a camera, a lidar, a radar, a milli-wave radar, a laser rangefinder, a sonar, or the like. Moving bodies including other vehicles (including the vehicle B) and pedestrians, and stationary objects including obstacles, fallen articles, and the like, are detected by these sensors as objects around the vehicle A. When another vehicle is present around the vehicle A, an identification number, a position, a speed, a type (vehicle type), a height, an advancement direction, a past travel trajectory, a future trajectory based on the past travel trajectory, and the like pertaining to the other vehicle are detected as specific examples of detection data. The object sensor 103 outputs the detected data to the controller 110.

The controller 110 is configured from, e.g., a microcomputer. The controller 110 has, e.g., a central processing unit (CPU) or other hardware processor, a memory, and a variety of interfaces. The memory and the variety of interfaces are connected to the hardware processor via a bus.

A computer program for causing the microcomputer to function as an information processing device is installed in the microcomputer. Due to execution of the computer program, the microcomputer functions as a plurality of information processing circuits provided to the information processing device. The controller 110 is provided with a communication control unit 111, as one example of the plurality of information processing circuits.

The communication control unit 111 controls wireless communication (data communication) performed by the communication unit 100.

The communication control unit 111 performs such actions as switching an operating mode of the communication unit 100 and controlling a beam formed by the communication unit 100. The communication unit 100 has, as operating modes that can be switched between, a normal mode and a directivity mode.

Figure 2A:
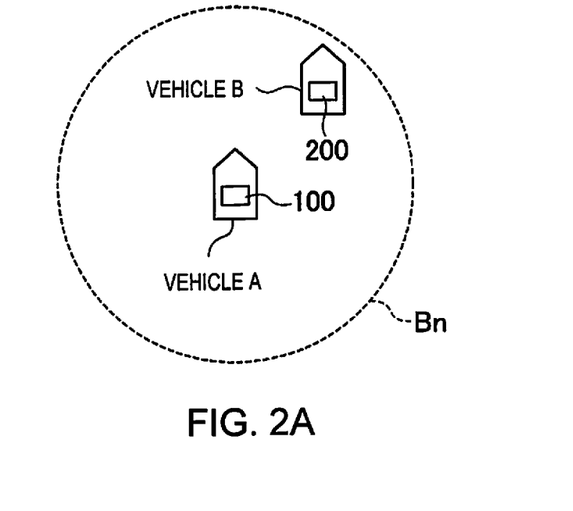
FIG. 2A is a diagram illustrating a normal mode of a communication unit.

The normal mode shall now be described with reference to FIG. 2A. In the normal mode, wireless communication is performed for a preset range (region) without directivity related to wireless communication performed by the communication unit 100 being controlled. When operating in the normal mode, the communication unit 100, or more specifically the antenna of the communication unit 100, forms a normal beam Bn for a prescribed range (region). The normal beam Bn is, for example, formed uniformly at every bearing, and does not have directivity with respect to a specific bearing. The normal beam Bn is formed in a circular range that is centered on the communication unit 100 and has a prescribed distance as a radius. Thus, the prescribed range in which the normal beam Bn is formed can be a circular range that has the prescribed distance as a radius or, as another example, can be a prescribed range having directivity in a prescribed direction, such as a vehicle advancement direction. Thus, in the normal mode, the normal beam Bn is formed for the preset prescribed range by the antenna of the communication unit 100.

The vehicle A can communicate with a vehicle B present in the region in which the normal beam Bn is formed. The region in which it is possible to communicate with a communication unit 100 operating in the normal mode is referred to as a normal communication region. The normal communication region basically corresponds to the region in which the normal beam Bn is formed. However, even in the region in which the normal beam Bn is formed, it might be impossible to communicate with the vehicle B at a communication quality equal to or higher than a given level due to effects of dampening of radio waves or effects of a communication environment in which an obstruction is present. Specifically, the normal communication region refers to a region in which it is possible to communicate with the vehicle B at a communication quality equal to or higher than a given level and does not necessarily coincide with the region (prescribed range) in which the normal beam Bn is formed.

Figure 2B:
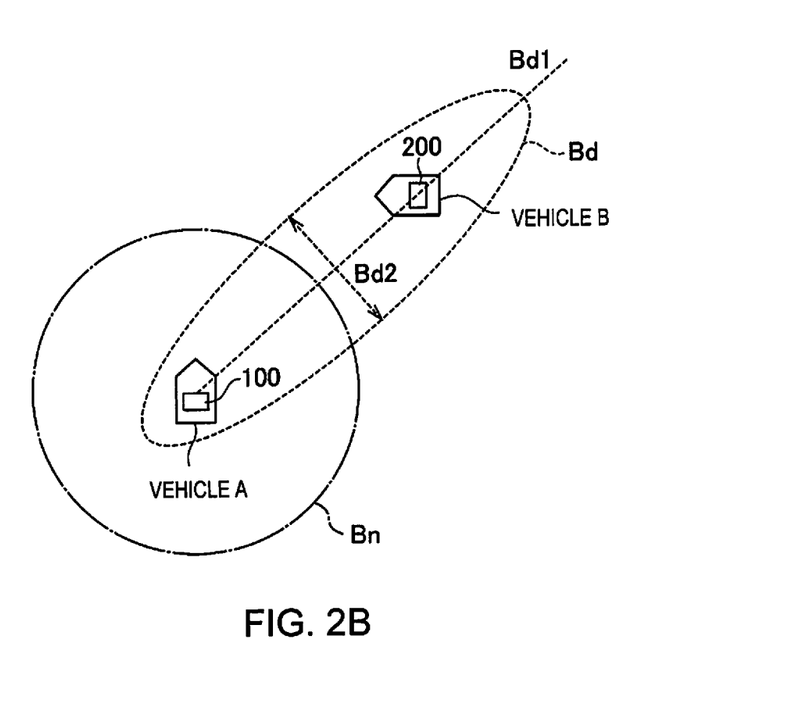
FIG. 2B is a diagram illustrating a directivity mode of the communication unit.

The directivity mode shall now be described with reference to FIG. 2B. In the directivity mode, the directivity related to wireless communication performed by the communication unit 100 can be controlled. In the present description, the directivity related to wireless communication is referred to below simply as "directivity." When operating in the directivity mode, the antenna of the communication unit 100 forms a directional beam Bd. The directional beam Bd is formed toward a specific bearing and has directivity with respect to the specific bearing. The bearing corresponds to a horizontal component of a direction. The directional beam Bd is formed as a beam having a prescribed beam width Bd2 centered on a beam axis Bd1 with which a prescribed azimuth will be obtained. The azimuth of the beam axis Bd1 and the beam width Bd2 can be individually adjusted, thereby making it possible to adjust the directivity of the communication unit 100. Thus, the directional mode corresponds to an operating mode in which the antenna of the communication unit 100 has directivity.

The vehicle A can communicate with the vehicle B present in the region in which the directional beam Bd is formed. The directional beam Bd is formed to be long in a direction following the beam axis Bd1, a distance in said direction (axial-direction distance) being greater than a radial distance of the normal beam Bn. Additionally, a reception power in communication using the directional beam Bd will be higher than a reception power in communication using the normal beam Bn when it is assumed that the vehicle B is present at the same position for each type of beam. Thus, using the directional beam Bd makes it possible to communicate with the vehicle B at a location outside of the normal communication region. The directional beam Bd makes it possible to perform data communication with the vehicle B present at a position at which it is impossible to perform data communication using the normal beam Bn. Specifically, in the directivity mode, directivity is controlled to a greater extent than in the normal mode, thereby making it possible to perform data communication with the vehicle B present at the position at which it is impossible to perform data communication in the normal mode.

When the communication unit 100 operates in the directivity mode, the communication control unit 111 controls the directional beam Bd. The control over the directional beam Bd includes beamforming for adjusting the azimuth of the beam axis Bd1 and the beam width Bd2. The communication control unit 111 controls the directivity of the communication unit 100, i.e., the directivity of the beam formed by the antenna of the communication unit 100, through beamforming.

The communication unit 100 broadcasts vehicle-A-position data including, inter alia, current position information and travel-plan information pertaining to the vehicle A. A direct communication scheme is used in the broadcast transmission. The direct communication scheme is, for example, DSRC (frequency: 5.9 GHz band), which is compliant with IEEE 802.11p, or Cellular V2X, which is compliant with specifications in 3GPP Release 14 or later.

The current position information is data correlating a latitude and longitude indicating a current position of the vehicle A with a time at which the position is acquired.

The travel-plan information is travel-plan data including vehicle-speed-plan data correlating a vehicle speed with a future position at which the vehicle A will travel in the future, and future-travel-route data. The future-travel-route data (future-route data) includes information pertaining to a route on which the vehicle A will travel in the future. The future-travel-route data can be route information pertaining to a travel route for traveling to a preset destination or can be data in which an expected passage time is correlated with a future position (latitude and longitude) based on the vehicle-speed-plan data. For example, the travel-plan information is data obtained by adding the vehicle-speed-plan data to data that conforms to a message under SAE J2735 (dedicated short range communications (DSRC) message set dictionary). The term "future" indicates a given point in time that will be reached after a prescribed time from a current time.

An example of the vehicle-A-position data that is broadcasted is shown in table 1. The vehicle-A-position data is package data including a header and content data.

TABLE 1

| Header | Identification number for transmission-source vehicle Identification information indicating type of content included in content region (containing, e.g., current position, travel-plan information, and identification ID of future position) |
|---|---|
| Content data | Current position information: data correlating time when position information is acquired with latitude and longitude Travel-plan information: travel-plan data including vehicle-speed-plan data correlating vehicle speed with future position of vehicle, and future-travel-route data |

As shown in table 1, an identification number for the vehicle A serving as a transmission source and identification information indicating a type of content included in the content data (e.g., an ID for identification indicating the current position information, the travel-plan information, and the like) are stored in the header of the vehicle-A-position data. The content data contains the current position information, which is data correlating the time when the position information is acquired with the latitude and longitude, and the travel-plan information.

As well as a function for controlling wireless communication performed by the communication unit 100, the communication control unit 111 assumes a data processing function for performing a variety of processes that are necessary for implementing wireless communication. The vehicle A position data, which is the package data including the header and the content data, is generated by the communication control unit 111 based on data acquired from the GPS receiver 101 or the like and data that is prerecorded in a memory provided to the controller 110. The vehicle A position data is transmitted by the communication unit 100 and received by the communication unit 200 of the vehicle B.

The communication unit 100 receives vehicle B position data that is transmitted by the communication unit 200 of the vehicle B and outputs the received vehicle B position data to the communication control unit 111. The communication control unit 111 acquires the vehicle B position data from the communication unit 100. Receipt of the vehicle B position data by the communication unit 100 means that direct communication between the vehicle A and the vehicle B is established.

In relation to the present embodiment, the communication control unit 111 specifies each vehicle B for which a quality of communication with the vehicle A does not satisfy a prescribed standard as a designated vehicle by using the data processing function. The communication control unit 111 identifies a relative position relative to the vehicle A, and a reception power that is energy of radio waves received from the designated vehicle, for each designated vehicle. The communication control unit 111 controls the directivity of the communication unit 100 based on the relative position and reception power for each designated vehicle.

A configuration of the vehicle B shall be described next.

As shown in FIG. 1, the vehicle B is provided with the communication unit 200 described above, a GPS receiver 201, a map information acquisition unit 202, an object sensor 203, and a controller 210. The communication unit 200, the GPS receiver 201, the map information acquisition unit 202, and the controller 210 constitute an information processing device for realizing the vehicle-to-vehicle communication indicated in the present embodiment.

Functions of the GPS receiver 201, the map information acquisition unit 202, and the object sensor 203 are similar to functions of the GPS receiver 101, the map information acquisition unit 102, and the object sensor 103. The controller 210 is configured from a microcomputer provided with a hardware processor, a memory, and a variety of interfaces, similarly to the controller 110. The controller 210 is provided with a communication control unit 211 as one example of a plurality of information processing circuits. Functions of the communication control unit 211 are the same as functions of the communication control unit 111 and include a function for controlling wireless communication performed by the communication unit 200 and a data processing function for performing a variety of processes that are necessary for implementing wireless communication, such as generating the vehicle-B-position data.

Figure 3:
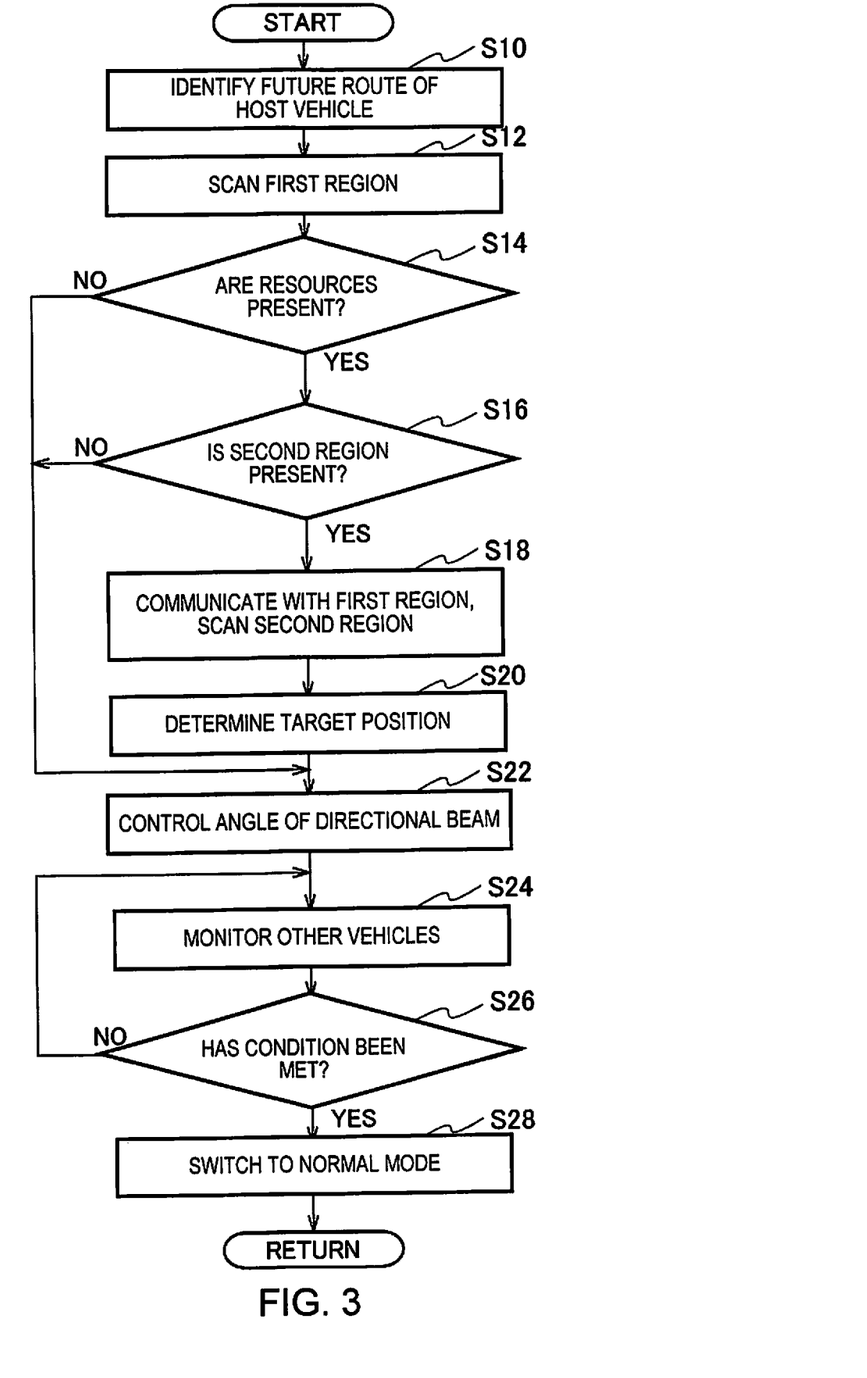
FIG. 3 is a flow chart showing a flow of a process in vehicle-to-vehicle communication on the communication network.

A flow of a process for vehicle-to-vehicle communication on the communication network shall now be described with reference to FIGS. 3 to 7. The process shown in the flow chart in FIG. 3 is executed by the controller 110 of a host vehicle A (corresponding to the vehicle A in FIG. 1). The operating mode of the communication unit 100 is initially set to the normal mode. In the description given below, a situation is assumed to involve traveling through an intersection such as that shown in FIG. 4. The host vehicle A is traveling on a first road connecting to an intersection indicated by a node N1. A current position of the host vehicle A is a position Pa (Xa, Xb) leading up to the intersection by a prescribed distance. A route on which the host vehicle A will travel in the future is set as a route on which the host vehicle A will turn left at the intersection.

Figure 4:
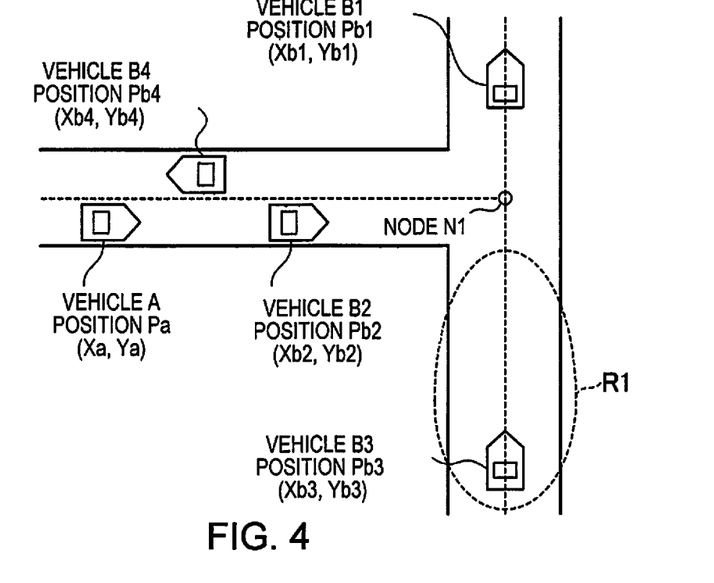
FIG. 4 is a diagram illustrating a travel situation and a first region according to the present embodiment.

Among four other vehicles B1 to B4 (each of which corresponds to the other vehicle B in FIG. 1), two other vehicles B1, B3 are traveling on an intersecting road that intersects the first road at the intersection indicated by the node N1. A current position of the other vehicle B1 is a position Pb1 (Xb1, Yb1) beyond the intersection. A current position of the other vehicle B3 is a position Pb3 (Xb3, Yb3) leading up to the intersection by a prescribed distance. Additionally, the other vehicle B2 is traveling on the first road and in the same travel lane as the host vehicle A, and the other vehicle B4 is traveling on the first road and in an oncoming lane. A current position of the other vehicle B2 is a position Pb2 (Xb2, Yb2) leading up to the intersection by a prescribed distance, the other vehicle B2 being in front of the host vehicle A. A current position of the other vehicle B4 is a position Pb4 (Xb4, Yb4) set apart from the intersection by a prescribed distance.

First, the controller 110 identifies a future position at which the host vehicle A will travel in the future (S10). For example, the controller 110 acquires the vehicle-speed-plan data included in the vehicle-A-position data and identifies the future position from the vehicle-speed-plan data. Alternatively, the controller 110 acquires the future-travel-route data included in the vehicle-A-position data and identifies the future position based on the future travel route.

The controller 110 evaluates whether or not a travel situation of the host vehicle A is a situation requiring attention. One example of a situation requiring attention is a situation in which the host vehicle A is traveling through the intersection, as shown in FIG. 4. The controller 110 performs the evaluation with reference to the map information acquired by the map information acquisition unit 102 and the future position of the host vehicle A. If the future position of the host vehicle A corresponds to the intersection, or if the intersection is included in the future travel route of the host vehicle, the controller 110 evaluates that the travel situation of the host vehicle A is a situation requiring attention.

Next, the controller 110 determines a first region in which another vehicle that the host vehicle A should be most aware of is present. In a situation in which the host vehicle A will turn left at the intersection, attention will need to be directed to the other vehicle B3, which will enter the intersection by way of the intersecting road. Accordingly, the controller 110 determines a region of the intersecting road where the other vehicle entering the intersection is present as a first region R1 based on the map information. The other vehicle that the host vehicle A should be most aware of is another vehicle that will arrive at the intersection at the same time as the host vehicle A. Accordingly, the controller 110 establishes a distance from the host vehicle A to the intersection as a reference distance. The controller 110 can set the first region R1 such that a position leading up to the intersection by the reference distance is employed as a starting point.

The controller 110 switches the operating mode of the communication unit 100 from the normal mode to the directivity mode. The controller 110 then controls sweeping of the directional beam Bd in the azimuth direction and scans the first region R1 (S12). Scanning the first region R1 using the directional beam Bd results in detecting the other vehicle B3 within the first region R1. The other vehicle B2, which is positioned between the first region R1 and the host vehicle A, is also detected at the same time. The communication unit 100 performs data communication with the other vehicles B2, B3 (communication units 200), whereby the controller 110 acquires vehicle-B-position data pertaining to each of the other vehicles B2, B3.

In a case of another vehicle that is distant from the host vehicle A or another vehicle that is not visible due to effects of an obstruction or the like, a reception power, which is energy of radio waves received from the other vehicle through communication using the normal beam Bn, will be at or below a given level. In such cases, a communication quality in communication with the other vehicle will not satisfy a prescribed standard. However, if a switch to the directional beam Bd is made, the reception power will exceed the given level, making it possible to communicate even with such an other vehicle. Accordingly, the controller 110 specifies, as a designated vehicle for which a communication quality (e.g., reception strength) does not satisfy the prescribed standard, another vehicle which is detected using an operation for scanning the first region R1 using the directional beam Bd and for which the communication quality is equal to or less than an assessment value. In the example shown in FIG. 4, the other vehicles B2, B3 are specified as designated vehicles.

If communication resources are available (YES in step S14), the controller 110 evaluates whether or not a second region R2 is present with reference to the map information (S16).

Figure 5:
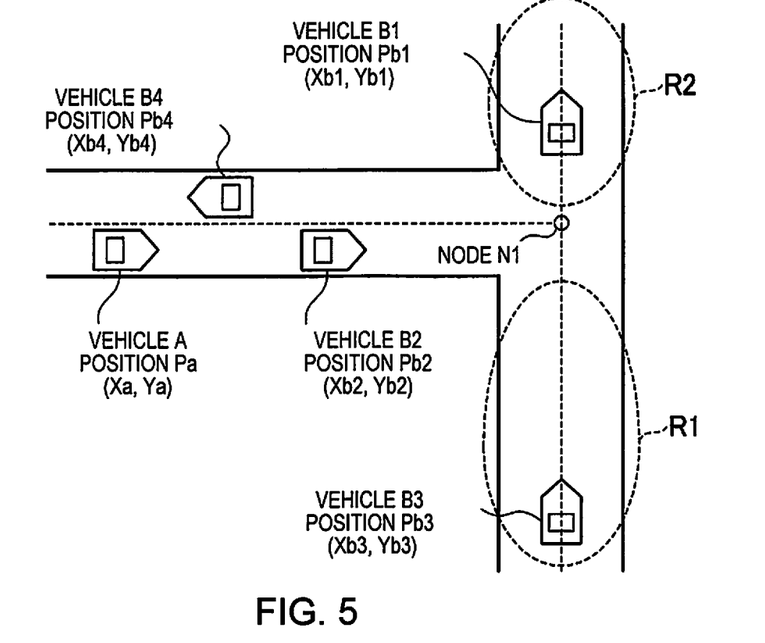
FIG. 5 is a diagram illustrating a travel situation and a second region according to the present embodiment.

The second region R2 is a region which follows the first region R1 and in which another vehicle that the host vehicle A should be aware of is present. In a situation in which the host vehicle A will turn left at the intersection, other vehicles on the intersecting road after the left turn could affect a travel plan of the host vehicle A. Thus, attention will also need to be directed to the other vehicle B1, which has passed through the intersection on the intersecting road. Accordingly, the controller 110 determines a region of the intersecting road where the other vehicle that has passed through the intersection is present as a second region R2, as shown in FIG. 5. The other vehicle that the host vehicle A should be aware of is another vehicle positioned near the intersection. Accordingly, the controller 110 can set a prescribed region near the intersection as the second region R2.

If the second region R2 is present (YES in S16), the controller 110 controls sweeping of a new directional beam Bd in the azimuth direction and scans the second region R2 while maintaining the directional beam Bd for communicating with the other vehicle B3 in the first region R1 (S18). Scanning the second region R2 using the directional beam Bd results in detecting the other vehicle B1 within the second region R2. The communication unit 100 performs data communication with the other vehicle B1 (communication unit 200), whereby the controller 110 acquires vehicle-B-position data pertaining to the other vehicle B1.

Similarly to the operation for scanning the first region R1, switching to the directional beam Bd results in the reception power exceeding a given level, making it possible to communicate even with the other vehicle. Accordingly, the controller 110 specifies, as a designated vehicle for which a communication quality (e.g., reception strength) does not satisfy a prescribed standard, another vehicle which is detected using an operation for scanning the second region R2 using the directional beam Bd and for which the communication quality is equal to or less than an assessment value. In the example shown in FIG. 5, the other vehicle B1 is specified as a designated vehicle.

Figure 6:
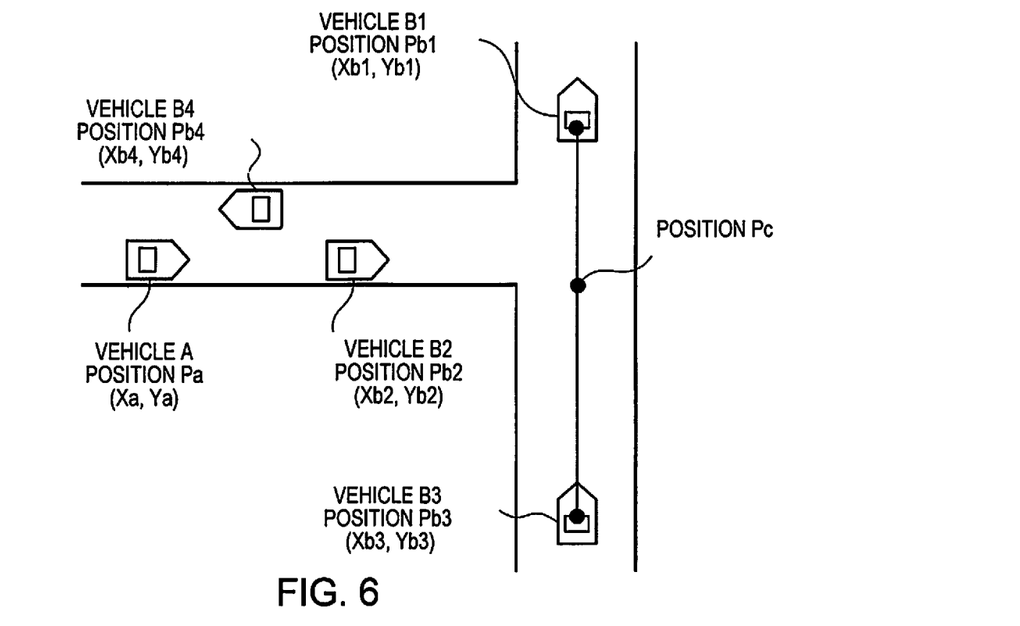
FIG. 6 is a diagram illustrating an electric power weighted-center position, which is a target position.

When the operations for scanning the necessary regions R1, R2 conclude, the controller 110 determines a target position Pc for directing the directional beam Bd, as shown in FIG. 6. The target position Pc is specifically described below.

First, the controller 110 determines degrees of priority for the three other vehicles B1 to B3. The controller 110 identifies a current position and speed of each of the other vehicles B1 to B3 from the vehicle-B-position data pertaining to each of the other vehicles B1 to B3. The controller 110 identifies a relative position and a relative speed of each of the other vehicles B1 to B3 relative to the host vehicle A based on the current position and speed of the host vehicle A. The controller 110 determines the degrees of priority for the three other vehicles B1 to B3 based on the relative positions and relative speeds. An order of other vehicles with which the host vehicle A should communicate in a prioritized manner is finalized using the degrees of priority. In the present embodiment, a higher degree of priority is determined for another vehicle having a greater effect on future travel of the host vehicle A.

Concepts underlying the degrees of priority determined for the other vehicles B1 to B3 shall now be described. First, the other vehicle B1 could stop immediately after passing through the intersection due to a forward traffic environment in which, e.g., congestion is present. In this case, the host vehicle A, which will turn left at the intersection, will be unable to enter the intersection, and it will therefore be necessary to change the travel plan. However, because the other vehicle B1 has already passed through the intersection, the effect of the other vehicle B1 on the host vehicle A will be lower than that of the other vehicles B2, B3. Meanwhile, because the other vehicle B2 is traveling in front of the host vehicle A, the other vehicle B2 could cross a path of the host vehicle A by decelerating. Additionally, because the distance from the intersection to the other vehicle B3 is substantially the same as that for the host vehicle A, the other vehicle B3 could cross the path of the host vehicle A at the intersection. Therefore, the other vehicles B2, B3 have a prominent effect on the host vehicle A.

The controller 110 identifies the effect of each of the other vehicles B1 to B3 on the host vehicle A from the relative positions and relative speeds of the other vehicles B1 to B3 and determines the degrees of priority for the other vehicles B1 to B3. In the example shown in FIG. 6, the other vehicles B2, B3 have high degrees of priority, and the other vehicle B1 has a low degree of priority. The controller 110 can refer to future positions of the other vehicles B1 to B3 and routes on which the other vehicles B1 to B3 will travel in the future when determining the degrees of priority for the other vehicles B1 to B3.

The controller 110 also refers to results of object detection by the object sensor 103 when determining the degrees of priority. As shown in FIG. 6, the other vehicle B2 is traveling in front of the other vehicle A. The other vehicle B2 is detected by the object sensor 103, whereby information such as the position and speed of the other vehicle B2 can be acquired. Thus, the other vehicle B2 can have a lower degree of priority than the other vehicles B1, B3 that cannot be detected by the object sensor 103. Accordingly, the controller 110 additionally refers to results of detection by the object sensor 103 to determine final degrees of priority for the other vehicles B1 to B3. In the example shown in FIG. 6, the other vehicles B1 and B3 have high degrees of priority, and the other vehicle B2 has a low degree of priority.

When, e.g., the directional beam Bd is oriented toward the other vehicle B3 in the first region R1, the reception power for the other vehicles B2, B3 that are close in position to the directional beam Bd will show a high value. For example, the reception power for the other vehicle B3 is 20 dB or greater according to SN ratio, and the reception power for the other vehicle B2 is 10 dB or greater according to SN ratio. However, the reception power for the other vehicle B1 in the second region R2, toward which the directional beam Bd is not oriented, will show a lower value than the reception power for the other vehicles B2, B3. For example, the reception power for the other vehicle B1 is 0 dB or lower according to SN ratio.

Accordingly, in order to communicate with both of the other vehicles B1, B3 having high degrees of priority, the controller 110 determines the target position Pc toward which the directional beam Bd is to be oriented. The target position Pc is defined according to an electric power weighted-center position determined based on the reception power, which is the energy of radio waves resulting when signals (vehicle-B-position data) are received from the other vehicles B1, B3, and the relative positions of the other vehicles B1, B3.

$$Pc=(Pb1 \times Gb1+Pb3 \times Gb3)/(2 \times (Gb1+Gb3)) \quad \text{(Expression 1)}$$

Expression 1 indicates the electric power weighted-center position of the radio waves received from the other vehicles B1, B3. Pb1 is the relative position of the other vehicle B1, and Pb3 is the relative position of the other vehicle B3. Gb1 is the reception power from the other vehicle B1, and Gb3 is the reception power from the other vehicle B3.

As shown in FIG. 6, the target position (electric power weighted-center position) Pc is a point that is defined on a line segment connecting the other vehicle B1 and the other vehicle B3 and that divides the line segment at a prescribed ratio. However, if the intersecting road on which the other vehicles B1, B3 are traveling does not follow the line segment connecting the other vehicle B1 and the other vehicle B3, the target position Pc might not be present on the intersecting road. Accordingly, if the shape of the intersecting road and the line segment connecting the other vehicle B1 and the other vehicle B3 do not match, the controller 110 can correct the line segment connecting the other vehicle B1 and the other vehicle B3 to a curve that follows the shape of the intersecting road. The controller 110 preferably corrects the target position Pc to a point that is on the corrected curve and that divides the curve at the prescribed ratio.

Figure 7:
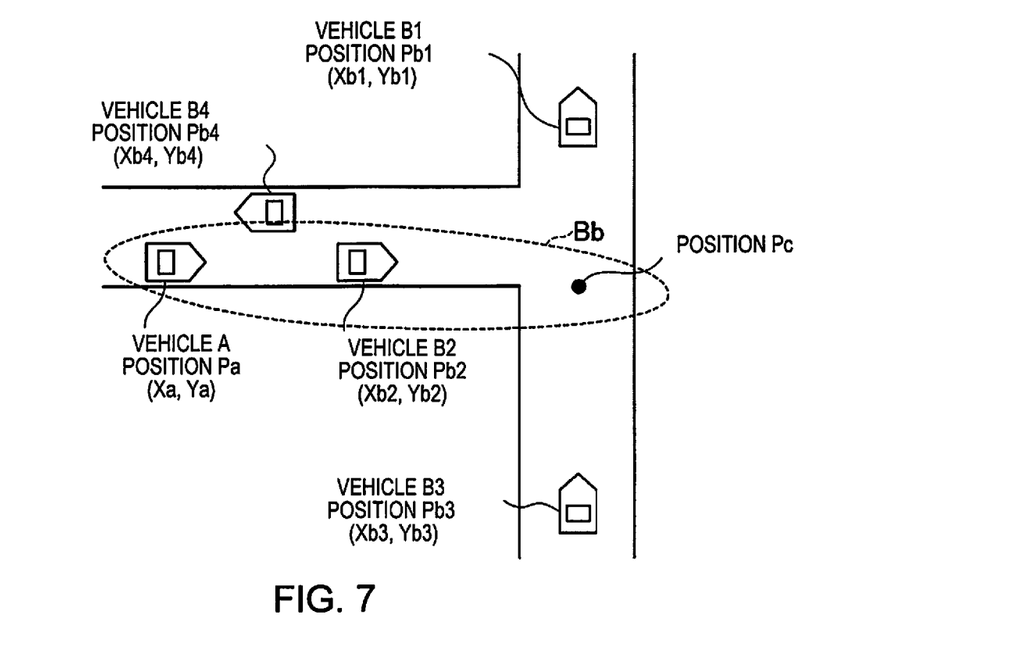
FIG. 7 is a diagram illustrating a directional beam oriented toward the target position.

When the target position Pc is determined, the controller 110 starts controlling an angle of the directional beam Bd (S22). As shown in FIG. 7, the controller 110 controls the directional beam Bd so as to be oriented toward the target position Pc. Specifically, the controller 110 adjusts the beam axis Bd1 of the directional beam Bd to a prescribed azimuth. The azimuth over which the beam axis Bd1 is to be oriented can be identified by computing an azimuth for when the target position Pc has been observed from the host vehicle A. Controlling the azimuth of the beam axis Bd1 adjusts the directional beam Bd so as to be oriented toward the target position Pc.

In addition to controlling the angle of the beam axis Bd1, the controller 110 can also control the beam width Bd2. Controlling the beam width Bd2 involves adjusting the beam width Bd2 such that the reception power from the other vehicles B1, B3 is maximized.

Thus, if the directional beam Bd is oriented toward the target position Pc, the directional beam Bd will be further away from the other vehicle B3 but will be closer to the other vehicle B1. The reception power for the other vehicle B3 will be lower in this case than when the directional beam Bd is oriented toward the other vehicle B3 in the first region R1, but the reception power for the other vehicle B1 will be higher. For example, the reception power for the other vehicle B3 becomes 10 dB or greater according to SN ratio, and the reception power for the other vehicle B1 becomes 10 dB or greater according to SN ratio. This makes it possible to ensure communication quality of a given level with respect to the plurality of other vehicles B1, B3 having high degrees of priority.

When the directional beam Bd is oriented toward the target position Pc, the controller 110 starts data communication with the other vehicles B1, B3 having high degrees of priority. The controller 110 then re-calculates the target position Pc according to transitions in the positions of the other vehicles B1, B3, which are traveling. The controller 110 controls the azimuth of the directional beam Bd based on the updated target position Pc.

The controller 110 monitors the other vehicles B1, B3 (S24). Monitoring the other vehicles B1, B3 includes monitoring current positions of the other vehicles B1, B3.

The controller 110 evaluates whether or not a condition under which it is possible to communicate with the other vehicles B1, B3 even using the normal beam Bn is met. Specifically, if a distance between the other vehicle B1 and the other vehicle B3 becomes shorter than a given assessment distance, or if the current positions of the other vehicles B1, B3 are present within the region of the normal beam Bn, the controller 110 evaluates that the above-mentioned condition is met (Yes in S26) and switches the operating mode of the communication unit 100 to the normal mode (S28). However, if it is evaluated that the condition is not met (NO in step S26), the controller 110 continues monitoring the other vehicles B1, B3 (S24).

If communication resources are not available (NO in step S14) or if no second region R2 is present (NO in step S16), the controller 110 preferably controls the angle of the directional beam Bd, as shall be described later, based on the current position of the other vehicle B1 in the first region R1 (S22).

In the present embodiment configured as described above, the controller 110 of the information processing device controls the directivity of the communication unit 100 based on the relative position and reception power for each designated vehicle. Considering the relative position and reception power for each designated vehicle makes it possible to control the directivity of the communication unit 100 so as to cover communication with a plurality of designated vehicles, as well as to perform data communication with the plurality of designated vehicles, making it possible to suitably accept necessary information.

In the present embodiment, other vehicles having routes that pass through the intersection included in the route on which the host vehicle will travel in the future are given as examples of designated vehicles. The other vehicles are preferably regarded as designated vehicles due to having a high possibility of affecting the future travel of the host vehicle. This makes it possible to suitably ascertain other vehicles that could affect the future travel of the host vehicle.

In the present embodiment, the controller 110 of the information processing device controls the directivity of the communication unit 100 based on the degree of priority determined for each designated vehicle. This makes it possible to sort a plurality of designated vehicles in accordance with the degrees of priority, making it possible to control the directivity of the communication unit 100 so as to cover the necessary designated vehicles. As a result, it is possible to perform data communication with desired designated vehicles, making it possible to suitably accept necessary information.

In the present embodiment, the controller 110 of the information processing device determines the degree of priority for each designated vehicle based on results of detection of the designated vehicle by the object sensor 103. For designated vehicles that can be detected by the object sensor 103, information obtained by the object sensor 103 can be applied, making it possible to evaluate that the degree of priority in communication is low. Accordingly, using the results of detection by the object sensor 103 makes it possible to suitably determine the degree of priority for each designated vehicle.

In the present embodiment, the communication unit 100 forms the directional beam Bd, whereby it is possible to adjust the directivity of the communication unit 100. In this case, the controller 110 individually adjusts the beam axis Bd1 and the beam width Bd2 to thereby control the directivity of the directional beam Bd. This makes it possible to suitably control the directivity of the communication unit 100.

In the present embodiment, the controller 110 of the information processing device derives the electric power weighted-center position (target position), toward which the directional beam Bd is to be oriented, based on the relative position and reception power for each designated vehicle and controls the directional beam Bd so as to be oriented toward the weighted-center position. This makes it possible to orient the directional beam Bd toward a position that enables communication with each designated vehicle, making it possible to suitably accept necessary information.

In the present embodiment, the controller 110 of the information processing device corrects the weighted-center position so as to follow the route on which the designated vehicle will travel in the future. The directional beam Bd can be controlled according to the route on which the designated vehicle will travel, making it possible to suitably communicate with the designated vehicle.

In the present embodiment, the controller 110 of the information processing device scans around the host vehicle A using the directional beam Bd and communicates with the designated vehicle to thereby detect the reception power. This makes it possible to suitably identify the reception power for the designated vehicle.

In the present embodiment, the communication unit 100 has, as operating modes that can be switched between, a directivity mode in which it is possible to control directivity and a normal mode having no directivity. The normal communication region is a region in which it is possible to perform data communication with the communication unit 100 operating in the normal mode. When the communication unit 100 operates in the normal mode having no directivity, it might not be possible to satisfactorily perform data communication with a communication target from which information pertaining to desired other vehicles is obtained. However, switching the operating mode of the communication unit 100 to the directivity mode makes it possible to control the directivity of the communication unit 100 relative to a desired communication target, as well as to satisfactorily perform data communication with the communication target, making it possible to suitably accept necessary information.

In the embodiment described above, a situation involving traveling through an intersection is given as an example of a situation requiring attention. However, the situation requiring attention could be any situation in which another vehicle that could affect future travel of the host vehicle is present such that the host vehicle and the other vehicle cross paths. For example, the situation requiring attention could be a situation in which the host vehicle traveling in a travel lane changes lanes to an overtaking lane. Another vehicle traveling in the overtaking lane could cross the path of the host vehicle, and therefore it is highly possible that the other vehicle will affect future travel. Therefore, in a situation involving a lane change, the other vehicle having a route involving traveling in the overtaking lane on the road on which the host vehicle is traveling is specified as the designated vehicle. This makes it possible to suitably ascertain the other vehicle that could affect future travel of the host vehicle. A situation involving overtaking can also include a situation in which an oncoming lane is used to perform an overtaking maneuver, in addition to a situation in which an overtaking lane is used to perform an overtaking maneuver.

The controller 110 preferably performs the process for specifying the designated vehicle when it has been assessed that the host vehicle is performing an overtaking maneuver. For example, when an operation signal that permits an occupant to perform an overtaking maneuver is detected, the controller 110 assesses that the host vehicle is performing an overtaking maneuver. Alternatively, the controller 110 can autonomously assess, based on map information and data pertaining to traveling vehicles, that the host vehicle is performing an overtaking maneuver under a condition that an obstacle is present in front of the host vehicle in the travel lane or that a preceding vehicle slower than the host vehicle is present. Thus, when the host vehicle is performing an overtaking maneuver, performing the process for specifying the designated vehicle using an overtaking maneuver by the host vehicle as a trigger makes it possible to specify the designated vehicle at a suitable timing.

The situation requiring attention is not limited to a specific travel situation. Additionally, if a plurality of other vehicles with which communication is to be carried out are present, the normal beam will normally be formed because it is only possible to communicate with a specific other vehicle if the directional beam is formed. However, if the other vehicles are present outside of the normal communication region of the communication unit 100, it will be impossible to communicate with the other vehicles. These other vehicles might also affect future travel of the host vehicle. Accordingly, other vehicles present outside of the normal communication region of the communication unit 100 are employed as designated vehicles, whereby, even if a plurality of designated vehicles are present, it is possible to control the directivity of the communication unit 100 so as to cover communication with the plurality of designated vehicles. This makes it possible to suitably ascertain other vehicles that could affect future travel of the host vehicle. For example, the controller 110 controls sweeping of the directional beam Bd and performs an operation for scanning around the host vehicle, thereby making it possible to assess whether another vehicle positioned outside of the normal communication region is present as well as to assess the reception strength for the other vehicle.

In the present embodiment, when specifying the designated vehicle, the controller 110 controls the directional beam Bd so as to be oriented toward the designated vehicle. However, the goal of communication with the designated vehicle performed by the host vehicle is to acquire information pertaining to the designated vehicle that will cross the path of the host vehicle. Even if the directional beam Bd is formed, vehicle-to-vehicle communication with the designated vehicle might be impossible due to a communication environment in which an obstruction is present between the host vehicle and the designated vehicle.

Figure 8:
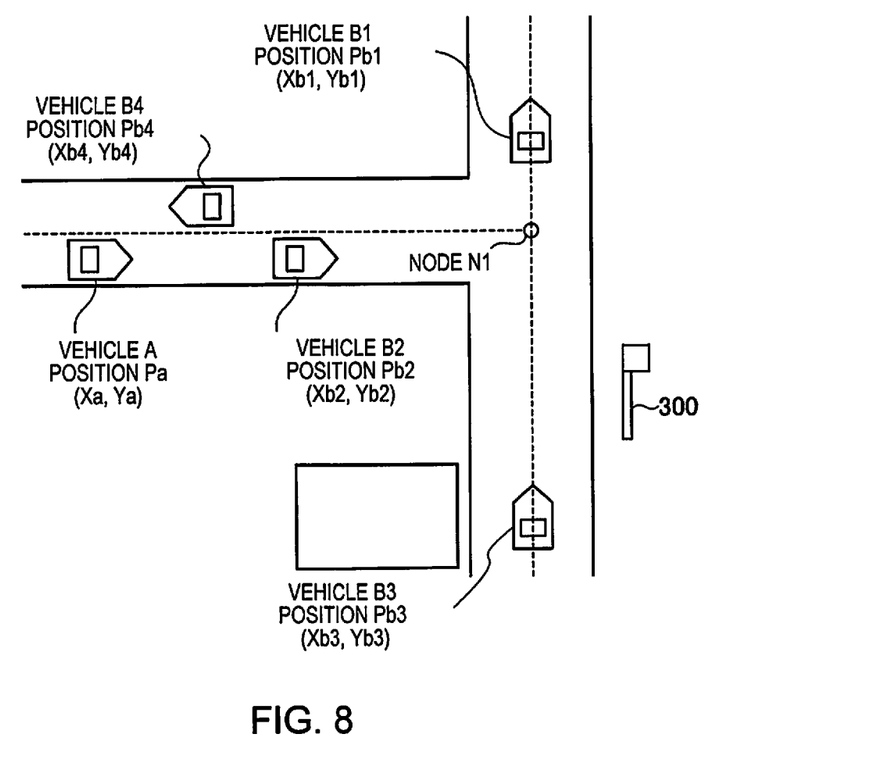
FIG. 8 is a schematic diagram showing a roadside unit.

As shown in FIG. 8, the roadside unit 300 for distributing information pertaining to the vehicles can be present on the road on which the host vehicle is traveling. Accordingly, when the roadside unit 300 for transmitting distribution data including information pertaining to the designated vehicle is present, the controller 110 can control the directional beam Bd so as to be oriented toward the roadside unit 300. For example, during the scanning operation described above, if it is possible to communicate with the roadside unit 300, the controller 110 can analyze the distribution data to thereby evaluate whether or not the roadside unit 300 is for transmitting distribution data including information pertaining to the designated vehicle. It is also possible to acquire, from the distribution data, position information pertaining to the roadside unit 300 toward which the directional beam Bd is to be oriented.

Thus, the controller 110 can control the directivity of the communication unit 100 so as to be oriented toward the roadside unit 300 for transmitting distribution data including information pertaining to the designated vehicle. This makes it possible to reliably perform data communication with the roadside unit 300, making it possible to suitably accept information pertaining to the designated vehicle evaluated to be crossing the path of the host vehicle. Specifically, the controller 110 can regard the roadside unit 300 for transmitting distribution data including information pertaining to the designated vehicle as a designated vehicle, rather than regarding the designated vehicle directly.

According to an information processing method disclosed in the present embodiment, directivity of a communication unit 100 is controlled based on a relative position and a reception power for each designated vehicle, similarly to the information processing device. This makes it possible to control the directivity of the communication unit 100 so as to cover communication with a plurality of designated vehicles in consideration of the relative position and reception power for each of the designated vehicles, as well as to perform data communication with the plurality of designated vehicles, making it possible to suitably accept necessary information.

In the present embodiment, an example is given in which a plurality of information processing circuits provided to controllers 110, 210 are realized using software. However, as shall be apparent, it is also possible to configure the information processing circuits by preparing dedicated hardware for processing various information. It is also possible for the plurality of information processing circuits to be configured from individual items of hardware.

Although an embodiment of the present invention is disclosed as described above, statements and drawings that form parts of this disclosure is not to be construed to limit the present invention. A variety of alternative embodiments, examples, and techniques for implementation will be apparent to persons skilled in the art from this disclosure.

The invention claimed is:

1. An information processing device comprising:
a communication unit configured to be mounted on a first moving body and to perform data communication with a plurality of second moving bodies present in a periphery of the first moving body; and
a controller configured to control the data communication performed by the communication unit,
the communication unit being configured to adjust directivity of wireless communication performed by the communication unit by forming a beam having directivity,
the controller being configured to
specify each of the second moving bodies for which a quality of communication with the first moving body does not satisfy a prescribed standard as a designated moving body,
identify a relative position relative to the first moving body for each of the designated moving bodies,
identify a reception power, which is energy of radio waves received from the designated moving body, for each of the designated moving bodies,
derive an electric power weighted-center position for radio waves received from each of the designated moving bodies based on the relative position and the reception power for each of the designated moving bodies, and
control directivity of the beam so as to be oriented toward the weighted-center positions of the designated moving bodies,
the beam formed by the communication unit having a prescribed beam width centered on a beam axis with which a prescribed azimuth will be obtained, and
the controller being configured to adjust the azimuth of the beam axis so as to be oriented toward the weighted-center position and adjust the beam width such that the reception power from each of the designated moving bodies is maximized.

2. The information processing device according to claim 1, wherein
the designated moving body is
a second moving body positioned outside of a normal communication region of the communication unit,
a second moving body having a route involving traveling in an overtaking lane on a road on which the first moving body is traveling, or
a second moving body having a route passing through an intersection included in a route on which the first moving body will travel in the future.

3. The information processing device according to claim 2, wherein
the communication unit has operating modes configured to be switched between a directivity mode in which directivity of wireless communication can be controlled and a normal mode in which the wireless communication in a preset region is performed without controlling directivity of the wireless communication,
a normal communication region is a region in which the data communication can be performed with the communication unit operating in the normal mode.

4. The information processing device according to claim 1, wherein
the controller is configured to
identify a relative speed relative to the first moving body for each of the designated moving bodies,
determine a degree of priority for each of the designated moving bodies based on the relative position and relative speed of each of the designated moving bodies, and
control the directivity of the wireless communication performed by the communication unit based on the degree of priority determined for each of the designated moving bodies.

5. The information processing device according to claim 4, further comprising an object sensor configured to detect objects around the first moving body, and the controller is configured to determines the degree of priority for each of the designated moving bodies based on results of detecting the designated moving bodies using the object sensor.

6. The information processing device according to claim 1, wherein the controller is configured to determine whether or not the first moving body is performing an overtaking maneuver, and perform a process to identify the designated moving body if it has been determined that the first moving body is performing an overtaking maneuver.

7. The information processing device according to claim 1, wherein the controller is configured to correct the weighted-center position so as to follow a route on which the designated moving bodies will travel in the future.

8. The information processing device according to claim 1, wherein the controller is configured to control the directivity of the beam and communicate with the designated moving bodies to detect the reception power.

9. The information processing device according to claim 1, wherein:

the communication unit is configured to perform the data communication with a roadside unit provided on a road on which the first moving body is traveling; and the controller is configured to designate the roadside unit, which transmits distribution data including information pertaining to the designated moving bodies, as a designated moving body.

10. The information processing device according to claim 1, wherein the weighted-center position is a point that is defined on a line segment connecting the designated moving bodies and that divides the line segment at a prescribed ratio.

11. The information processing device according to claim 1, wherein the weighted-center position is determined based on the reception power, which is the energy of radio waves resulting when signals are received from the designated moving bodies, and the relative positions of the designated moving bodies.

12. An information processing method for an information processing device comprising a communication unit configured to be mounted on a first moving body and performs data communication with a plurality of second moving bodies present around the first moving body, and a controller configured to control the data communication performed by the communication unit, the information processing method comprising:

specify each of the second moving bodies for which a quality of communication with the first moving body does not satisfy a prescribed standard as a designated moving body, identify a relative position relative to the first moving body for each of the designated moving bodies, identify a reception power, which is energy of radio waves received from the designated moving body, for each of the designated moving bodies, derive an electric power weighted-center position for radio waves received from each of the designated moving bodies based on the relative position and the reception power for each of the designated moving bodies, and control directivity of the beam so as to be oriented toward the weighted-center positions of the designated moving bodies, the beam formed by the communication unit having a prescribed beam width centered on a beam axis with which a prescribed azimuth will be obtained, and the controller being configured to adjust the azimuth of the beam axis so as to be oriented toward the weighted-center position and adjust the beam width such that the reception power from each of the designated moving bodies is maximized.

* * * * *